United States Patent [19]
Kamabayashi et al.

[11] Patent Number: 5,475,859
[45] Date of Patent: Dec. 12, 1995

[54] DISK CACHE UNIT HAVING REDUCED WAITING TIMES FOR DATA TRANSFER

[75] Inventors: Kosaku Kamabayashi; Katsunori Nakamura, both of Odawara; Takao Satoh, Kawasaki; Teruo Nagasawa, both of Hiratsuka, all of Japan

[73] Assignee: Hitachi, Ltd., Tokyo, Japan

[21] Appl. No.: 231,916

[22] Filed: Apr. 25, 1994

Related U.S. Application Data

[63] Continuation of Ser. No. 721,928, Jun. 21, 1991, Pat. No. 5,396,751, which is a continuation of Ser. No. 400,944, Aug. 31, 1989, abandoned.

[30] Foreign Application Priority Data

Sep. 2, 1988 [JP] Japan .................................. 63-219732

[51] Int. Cl.⁶ .................................................. G06F 13/00
[52] U.S. Cl. ........................ 395/825; 395/445; 364/964.2; 364/243.41; 364/DIG. 1
[58] Field of Search .................................. 364/200, 900; 395/275, 425

[56] References Cited

U.S. PATENT DOCUMENTS

| | | | |
|---|---|---|---|
| 4,371,929 | 2/1983 | Brann et al. | 364/200 |
| 4,476,526 | 10/1984 | Dodd | 364/200 |
| 4,536,836 | 8/1985 | Dodd et al. | 364/200 |
| 4,571,674 | 2/1986 | Hartung | 364/200 |
| 4,723,223 | 2/1988 | Hanada | 364/900 |
| 4,780,808 | 10/1988 | Morano et al. | 364/200 |
| 4,792,917 | 12/1988 | Takamatsu et al. | 364/900 |
| 4,819,203 | 4/1989 | Shiroyanagi et al. | 364/900 |
| 4,849,929 | 7/1989 | Timsit | 364/900 |
| 4,870,565 | 9/1989 | Yamamoto et al. | 364/200 |
| 4,956,803 | 9/1990 | Tayler et al. | 364/900 |
| 4,972,316 | 11/1990 | Dixon et al. | 364/200 |
| 4,972,364 | 11/1990 | Barett et al. | 364/900 |

*Primary Examiner*—Christopher B. Shin
*Attorney, Agent, or Firm*—Antonelli, Terry, Stout & Kraus

[57] ABSTRACT

A disk cache control unit disposed between an upper-rank processor and a disk unit, comprising a cache memory for holding a copy of data stored in the disk unit, at least one first interface controller which checks, in response to an input/output command requesting data to be read from the upper-rank processor, whether or not the data requested by the command is stored in the cache memory, and requests a head positioning of the disk unit when the data is not stored in the cache memory, and a second interface controller which indicates head positioning to the disk unit in response to a head positioning request, notifies the completion of the head positioning to the first interface controller in response to a notice of the completion of the head positioning, and which reads data from the disk unit and stores the data in the cache memory when a data transfer request did not come in a specified time period set to read data from the disk unit without a rotational delay after a notice of the head positioning head been given to the first interface controller and the subsequent transfer of data from the second interface controller had been completed, and which gives a notice of storage of the data in the cache memory through memory means to the first interface controller, and in response to this storage notice, the first interface controller reads the data from the cache memory and transfers the data to the upper-rank processor.

5 Claims, 7 Drawing Sheets

DISK CACHE UNIT HAVING REDUCED WAITING TIMES FOR DATA TRANSFER

This is a continuation of application Ser. No. 07/721,928, filed Jun. 21, 1991, now U.S. Pat. No. 5,396,751, which is a continuation of parent application Ser. No. 07/400,944 filed Aug. 31, 1989, now abandoned.

BACKGROUND OF THE INVENTION

The present invention relates to a disk cache control unit, and more particularly to a disk cache control unit which is adapted to reduce the time required for data transfer between an upper-rank processor and a disk unit, in an information processing system.

It has been well known that in a general-purpose electronic computer system employing a disk unit which uses a rotary disk as a storage medium, a disk cache control unit having a cache memory comprising a semiconductor memory, for example, accessible faster than the disk unit, is provided between a high-speed operating CPU and a disk unit which provides a slow data access operation due to a rotational delay or a seek action of the storage medium. The disk cache control unit can copy a part of the data stored in the disk unit into the cache memory as occasion demands and is able to respond to input/output requests from the CPU with data stored in the cache memory insofar as feasible, thereby making high-speed access to data possible.

More specifically, when an input/output command is given by the CPU, the disk cache control unit accesses the cache memory if the target data is present in the cache memory or it accesses the disk unit if the target data is not present in the cache memory, stores a copy of the accessed data in the cache memory and also stores data of a certain size located in the neighborhood of that accessed data in the cache memory, the latter storage operation being done to provide for a request for data by an input/output command to be executed later.

If the data requested by the input/output command is not stored in the cache memory, the disk cache control unit instructs the disk unit to position the head so as to access the desired data on the disk. While the head positioning is under way, the disk cache control unit normally disconnects from the disk unit and waits for an input/output command from the CPU and also waits for the disk unit to complete the head positioning. On sensing that the head has been positioned at the disk unit, the disk cache control unit resumes connection with the disk unit and transfers the data.

However, if the disk cache control unit receives and executes another input/output command, it cannot detect the completion of the head positioning at the disk unit. Therefore, it was conventionally impossible to access data on the disk unit in which the head has been positioned for this time until the head is positioned again to the desired data after the input/output command has been executed.

There is a known technology, disclosed in JP-A-60-101654 for example, which is effective in reducing such a wasteful rotational delay of the disk unit.

Specifically, this technology is to install in a magnetic disk control unit disposed between the CPU and the magnetic disk unit an interruption detection mechanism, independent of the magnetic disk controller, for detecting a positioning completion interruption and a rotational delay completion interruption of the magnetic disk unit. With such a mechanism while data is being transferred from the magnetic disk unit to the main storage (on the CPU side), the CPU does not accept the above-mentioned interruptions from other magnetic disk units so as to allow the data transfer to the main storage to be completed and the CPU accepts interruptions only in the period in which there remains only staging to be carried out (the staging being an operation to store data) after the completion of the data transfer in the cache memory, in units of tracks for example, to provide for requests for data by input/output commands to be issued next, and when an interruption request is detected, the staging is suspended, so that wasteful rotational delays are reduced.

In the prior art described above, however, no consideration was given to the realization of a capability of the disk cache control unit to control data transfer with the main storage and data transfer with the disk unit independently and asynchronously. Therefore, even if the head positioning has been completed in the disk unit in the time period in which the data requested by an input/output command is being transferred from the cache memory to the main storage, data transfer from the disk unit to the main storage cannot be started before data transfer from the cache memory to the main storage is completed. After the data transfer has been completed, to get data from the disk unit, it is necessary to re-position the head in the disk unit, for which a wasteful rotational delay arises.

SUMMARY OF THE INVENTION

The object of the present invention is to provide a disk cache control unit which can reduce wasteful rotational delays on the disk unit side in the exchange of data between an upper-rank processor and a disk unit through the intermediary of a disk control unit.

The disk cache control unit according to the present invention comprises an upper-rank processor including a CPU, a main storage and a channel unit, a cache memory for holding a copy of data to be stored in the disk unit, at least one first interface controller and at least one second interface controller. On receipt of an input/output command from the upper-rank processor asking for data to be read from the disk unit, the first interface controller examines the data stored in the cache memory, and if there is desired data stored therein, transfers the data to the upper-rank processor according to a subsequent input/output command controller, or if there is not the desired data stored in the cache memory, issues a head positioning command to the disk unit. In response to this head positioning command, the second interface controller positions the head in the disk unit, and when the head positioning has been completed, issues information as to the completion of the head positioning. If, in response to this, a data transfer request is given from the first interface controller to the second interface controller and a subsequent command is read, the second interface controller reads out data from the disk unit and stores the data in the cache memory, and sends the data to the first interface controller, which in turn transfers the data to the upper-rank processor. If the first interface controller did not give a data transfer request to the second interface controller by the time a read operation of data from the second interface controller should have started after the completion of the head positioning, or even though a data transfer request has been given and the data transfer has been carried out once, if a subsequent input/output command is not given by the upper-rank processor within a specified time for reading data from the disk unit, the lower-rank interface controller stores a range of data that is requested by the initial input/output command in the cache memory and issues a request for transfer of the stored data. This request is detected by the first interface controller through the intermediary of memory means. Then, the first interface controller requests the upper-rank processor to give a subsequent input/output command and on receipt of this command, reads data from the cache memory and transfers it to the processor. The head positioning request from the first interface controller to the second interface controller and the cache-memory-stored data transfer request from the second interface controller to the first interface controller are given through the intermediary of memory means. The first and second interface controllers can operate independently of each other.

According to the present invention, the first and second interface controllers that are operable mutually independently are installed in the disk cache control unit. Therefore, when the head positioning has been completed in the disk unit, even if all first interface controllers, if there are more than one, are being engaged in data transfer between the cache memory and the upper-rank processor, the second interface controller can transfer data from the disk unit to the cache memory, thereby preventing the occurrence of a wasteful rotational delay of the disk. Similarly, when a command overrun takes place, wasteful rotational delays can be prevented from occurring.

In the disk cache control method according to the present invention, which uses a disk cache control unit installed between an upper-rank processor and a disk unit and having a cache memory for holding a copy of data stored in the disk unit, when the head is positioned to desired data on the disk in accessing data requested by an input/output command from the upper-rank processor, the disk cache control unit judges whether or not the data is accessible in a specified period, and if it has become apparent that the data is not accessible in the specified period, stores at least the data in the cache memory and thereafter responds to input/output commands from the upper-rank processor with data stored in the cache memory.

Furthermore, in the disk cache control method, which uses a disk cache control unit disposed between the upper-rank processor and the disk unit and having a cache memory for holding a copy of data stored in the disk unit, when an input/output command is not given in time for an access operation to the disk unit in accessing the disk unit according to an input/output command from the upper-rank processor, the cache memory stores at least the data requested by the input/output command in the cache memory, and thereafter responds to input/output commands with data stored in the cache memory.

An information processing system incorporating a disk cache control unit according to the present invention comprises an upper-rank processor, a disk unit and a disk cache control unit disposed between the upper-rank processor and the disk unit and having a cache memory for holding a copy of data stored in the disk unit, said disk cache control unit having therein at least one interface controller, operable mutually independently when there are more than one unit, for controlling the exchange of information with the upper-rank processor and at least one second interface controller for controlling the exchange of information with the disk unit. When accessing data stored in the disk unit by complying with an input/output command from the upper-rank processor, the second interface controller judges whether or not the desired data is accessible in a specified period before the head is positioned to the target data in the disk unit, and if it is found that the data is not accessible in the specified period, the second interface controller stores at least the said data in the cache memory and notifies the first interface of the presence of the desired data in the cache memory. On receipt of the notice from the second interface controller, the first interface controller responds to input/output commands from the upper-rank processor with data held in the cache memory.

In addition, in the information processing system comprising an upper-rank processor, a disk unit and a disk cache control unit according to the present invention, wherein the disk cache control unit is installed between the upper-rank processor and the disk unit and has a cache memory for holding a copy of data stored in the disk unit, and wherein the disk cache control unit further comprises at least one interface controller, operable mutually independently when there are more than one unit, for controlling the exchange of information with the upper-rank processor, and at least one second interface controller for controlling the exchange of information with the disk unit, when accessing the disk unit in response to an input/output command from the upper-rank processor, if it is found that an input/output command is not given in time for an access operation to the disk unit, the second interface controller stores at least the data requested by that input/output command in the cache memory, and the first interface controller responds to input/output commands with the data stored in the cache memory.

According to the disk cache control method of the former type described above, in the asynchronous exchange of data between the CPU and the disk cache control unit, on the one hand, and between the disk cache control unit and the disk unit, on the other hand, for example, even if there is contention between the completion of the head positioning to the target data on the disk unit side and the exchange of other data between the upper-rank processor and the cache memory, the data to which the head has been positioned is not given up, but is read from the disk unit and stored in the cache memory, and after the data exchange between the upper-rank processor and the cache memory has been completed, the upper-rank processor is granted access to the target data stored in the cache memory, thus reducing wasteful rotational delays owing to re-positioning of the head necessary to access the data in the disk unit.

According to the disk cache control method of the latter type described above, in the exchange of data between the CPU and the disk unit, even if a command overrun occurs in which a part of a series of input/output commands to be issued from the CPU are not given in time for a head positioning operation on the disk unit side, the data is stored in the cache memory, and the data in the cache memory is used to respond to a retry of input/output commands involved in the command overrun, thereby reducing wasteful rotational delays required for re-positioning of the head to access data in the disk unit.

According to the former information processing system described above, when data exchange between the CPU and the disk cache control unit, on the one hand, and between the disk cache control unit and the disk unit, on the other hand, is effected asynchronously by the first and second interface controllers, for example, even if there is contention between the completion of positioning of the head by the second interface controller to the target data on the disk unit side and the exchange by the first interface controller of other data between the upper-rank processor and the cache memory, the second interface controller, without giving up the data to which the head has been positioned, reads the data from the disk unit and stores it in the cache memory and notifies the first interface controller of the presence of the target data in the cache memory, and on receipt of this notice, the first interface controller allows the upper-rank processor to access the target data stored in the cache memory after the exchange of other data between the upper-rank processor and the cache memory has been completed, thus enabling a reduction of wasteful rotational delays necessary for re-positioning of the head to access the data in the disk unit.

Therefore, it is possible to shorten the time required for exchange of data between the upper-rank processor and the disk unit.

According to the latter information processing system described above, even if a command overrun occurs in which a part of a series of input/output commands issued from the CPU are not given in time for a head positioning operation on the disk unit side, the second interface controller stores the data in the cache memory and notifies the first interface controller of the presence of the target data in the cache memory, and on receipt of this notice, the first interface controller responds to a retry of input/output commands involved in the command overrun with data in the cache memory. Wasteful rotational delays necessary for re-positioning of the head to access data in the disk unit are thus reduced.

In this way, the time required for the exchange of data between the upper-rank processor and the disk unit can be shortened.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENT

An embodiment of the present invention will now be described in detail with reference to the accompanying drawings.

Figure 1:
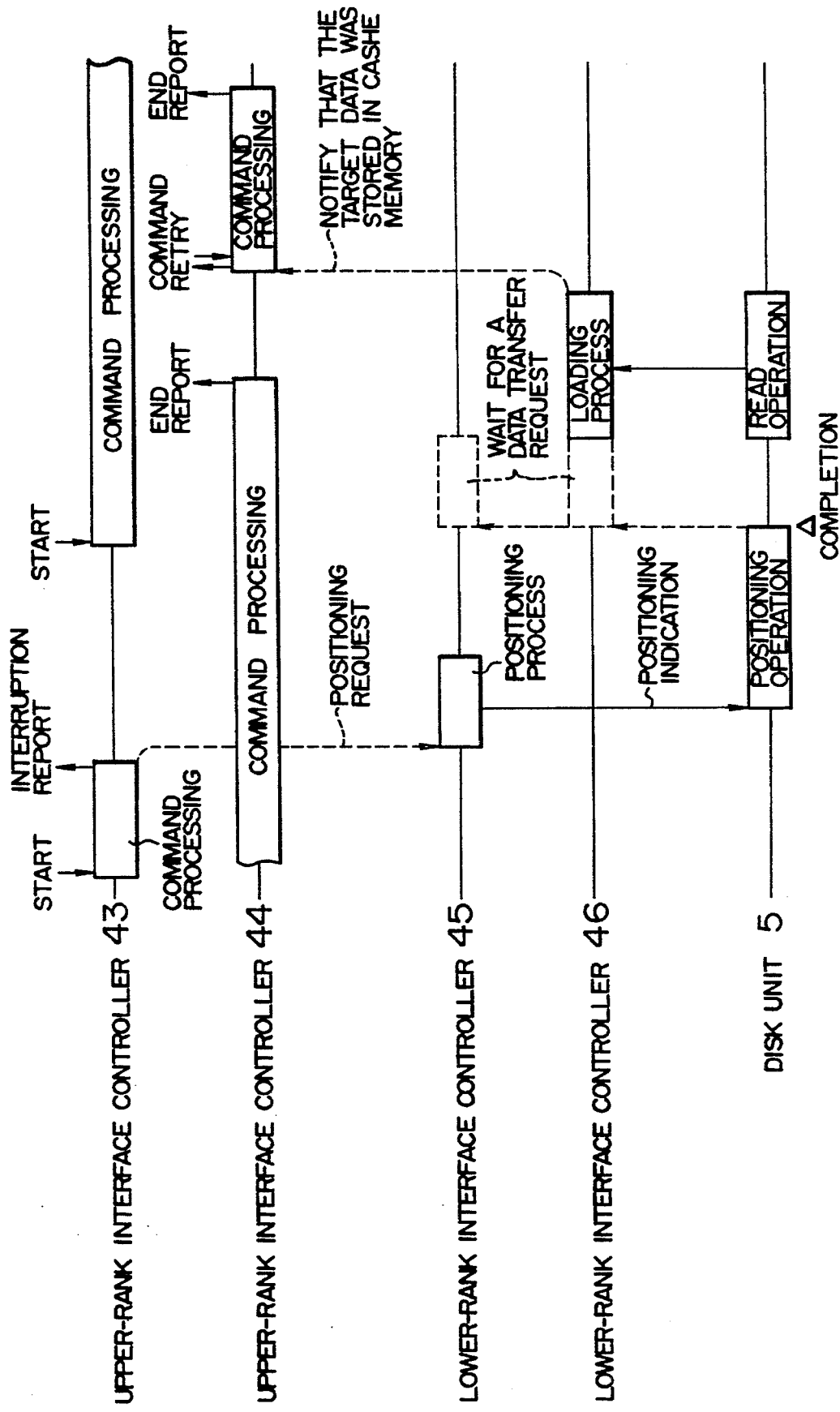
FIG. 1 is a drawing for explaining an example of the operation of a disk cache control unit according to an embodiment of the present invention.
Figure 2:
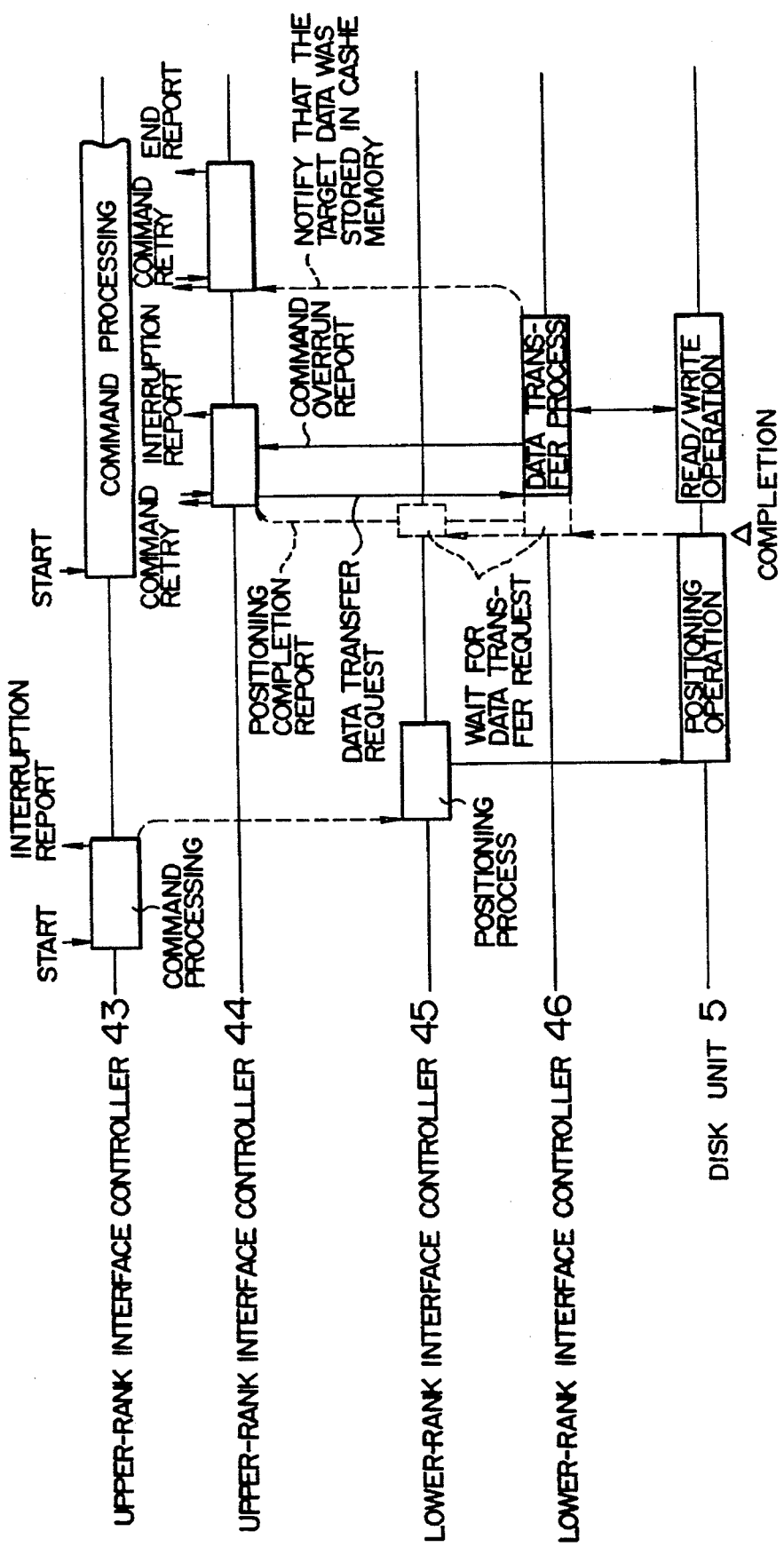
FIG. 2 is a drawing for explaining an example of the operation of the same disk cache control unit according to an embodiment of the present invention.
Figure 3:
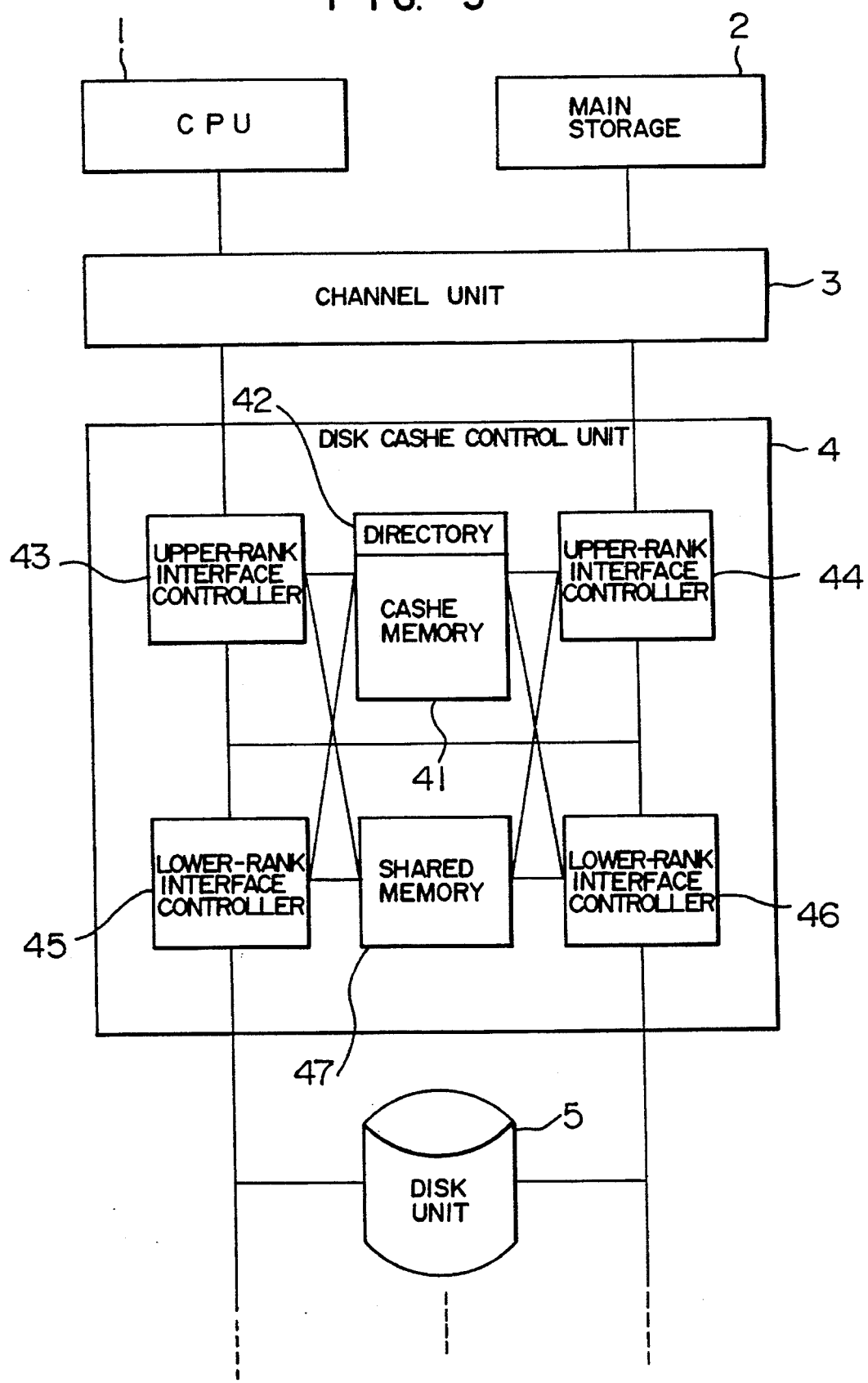
FIG. 3 is a block diagram showing an example of an information processing system including the disk cache control unit according to an embodiment of the present invention.

FIGS. 1 and 2 are provided for explaining the outline of an example of the disk cache control operation in an information processing system including a disk cache control unit according to an embodiment of the present invention. FIG. 3 is a block diagram showing the configuration of an electronic computer system, which is an example of the information processing system including the disk cache control unit according to the present invention.

The electronic computer system is composed of a CPU 1, a main storage 2, a channel unit 3, a disk cache control unit 4, and a disk unit 5 which operates as an external storage.

The CPU 1 controls the whole computer system, the main storage 2 has stored therein information, such as data and commands to be processed by the CPU 1 and the channel unit 3, the channel unit 3 conveys commands and data between the main storage 2 and the outside in response to a command from the CPU 1.

The disk cache control unit 4 interposed between the channel unit 3 and the disk unit 5 includes a cache memory 41 which keeps a part of data stored in the disk unit 5 copied as occasion demands in completely equivalent form as it is stored in the disk unit 5, and a directory 42 in which, for example, management information regarding the data copied in the cache memory is stored. The data memory locations are specified by cylinder numbers and head numbers. In the directory 42, there is stored information indicating whether or not data in the memory locations in the disk unit 5, which are specified cylinder numbers and head numbers, is stored in the cache memory 41, and if the data is stored, information indicating in what locations in the cache memory 41 the data is stored is also retained. The directory 42 is a known device which comprises a memory to store these items of information therein, a logic circuit to check if data is stored or not, and so on. In response to a request to access data in the disk unit 5 from the channel unit 3, the disk cache control unit 4 judges, on the basis of management information, whether or not the data in the disk unit, which is specified by a cylinder number and a head number in the request, exists in the cache memory 41. When the data exists in the cache memory 41, the disk cache control unit 4 responds to the access request with data stored in the cache memory 41, and if the data does not exist in the cache memory, it performs a control operation to permit a direct access to the disk unit 5.

In this case, the disk cache control unit 4 has provided therein, for example, a plurality of upper-rank interface controllers 43, 44 and a plurality of lower-rank interface controllers 45, 46, each of these controllers being constituted of a microprocessor, and a shared memory 47.

In this embodiment, there are provided two upper-rank interface controllers and two lower-rank interface controllers. However, the disk cache control unit can operate with one each of the upper-rank and lower-rank interface controllers. Since the upper-rank interface controller and the lower-rank interface controller operate mutually independently, the upper-rank interface controllers and the lower-rank interface controllers need not be the same in number. The necessary numbers of the interface controllers of the respective ranks are determined according to the load shared.

The upper-rank interface controllers 43, 44, operating independently of each other, are each arranged to control the interface with the channel unit 3 and also control data transmission between the channel unit 3 and the cache memory 41.

The lower-rank interface controllers 45, 46, operating independently of each other, each control the operation of the disk unit 5 and data transmission between the cache memory 41 and the disk unit 5.

Figure 4:
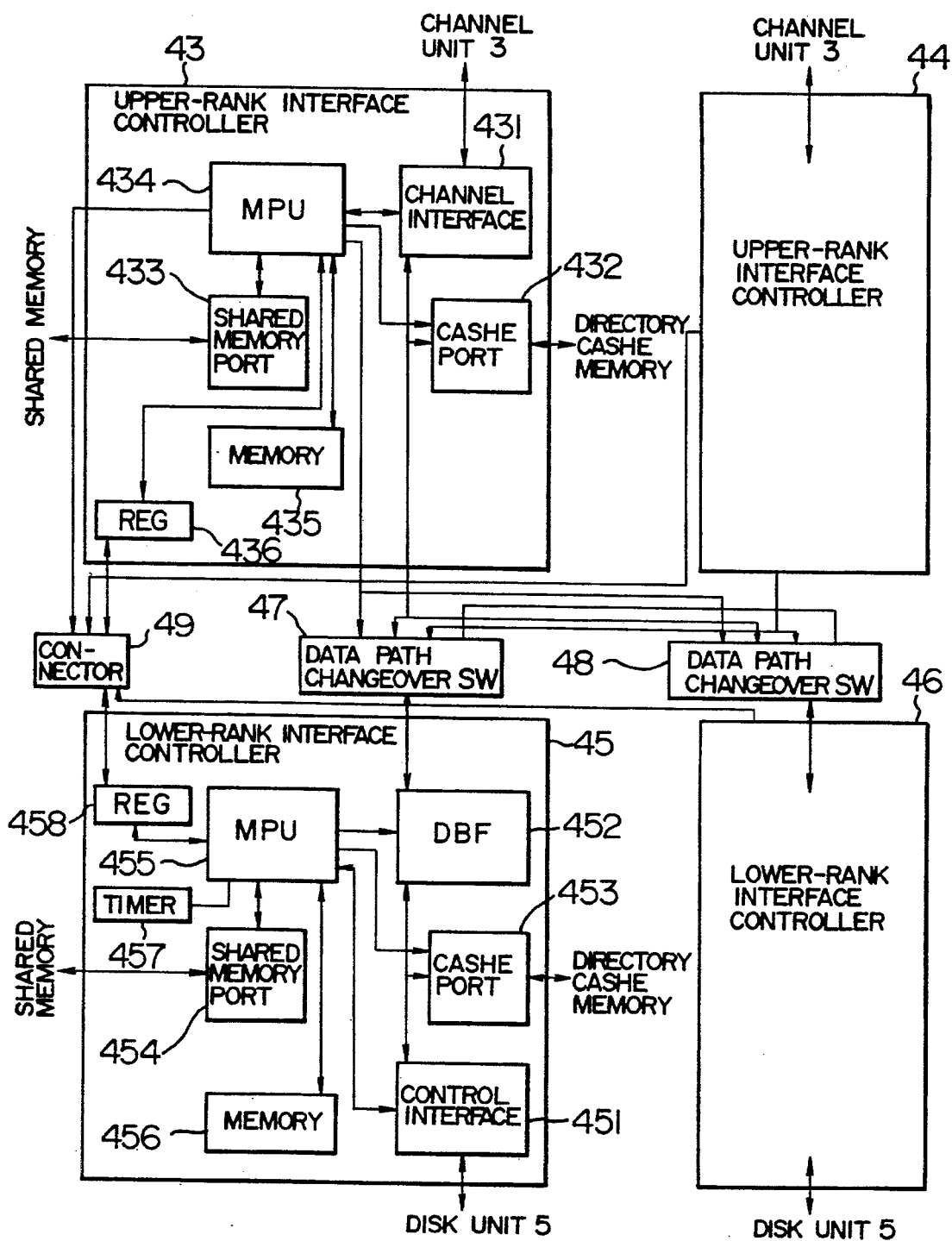
FIG. 4 is a block diagram showing essential components of the disk cache control unit of FIG. 3.

FIG. 4 shows an example of the arrangement of the upper-rank interface controller 43 and the lower-rank interface controller 45. Being identical with the arrangement of the upper-rank interface controller 43 and the lower-rank interface controller 35, the arrangement of the upper-rank interface controller 44 and the lower-rank interface controller 46 will not be described.

The upper-rank interface controller 43 includes a channel interface 431 for controlling the interface with the channel unit 3, a cache port 432 for data transmission with the directory 42 and the cache memory 41, a shared memory port 433 for data transmission to or from the shared memory 47, a microprocessor (MPU) 434 for supervising and controlling those devices, a memory 435 for storing micro programs, lower-rank interface controllers 45, 46, and a register 436 for sending or receiving control information at high speed to or from the lower-rank interface controllers 45, 46.

The lower-rank interface controller 45 includes a control interface 451 for controlling the interface with the disk unit 5, a data buffer (DBF) 452 for temporarily storing data to be written into the disk unit 5 and data to be read therefrom, a cache port 453 for transmitting data to or from the directory 42 and the cache memory 41, a shared memory port 454 for exchanging data with the shared memory 47, a microprocessor (MPU) 455 for supervising and controlling those devices, a memory 456 for storing micro programs, a hardware timer 457, and a register 458 for sending or receiving control information at high speed to or from the upper-rank interface controllers 43, 44.

In addition, there are provided data path changeover switches 47, 48 for switching over the data transfer route between the upper-rank interface controller and the lower-rank interface controller from one data transfer path to another in order to continuously perform the data transfer described above by connecting a selected upper-rank interface controller with a selected lower-rank interface controller when data is transferred between the channel unit 3 and the disk unit 5.

In each of the upper-rank interface controllers 43, 44, there is provided a register 436 for high-speed information transfer to or from the lower-rank interface controllers, said register 436 being connectable through a connector 49 to a register 458 for high-speed information transfer to or from the upper-rank interface controllers.

In the upper-rank interface controller 43, when an input/output command for data read-out is supplied from the channel unit 3, the command is moved through channel interface 431 to the MPU 434 which decodes the command and checks the directory 42 through the cache port 432 to see if the requested data is stored in the cache memory 41, and if the data is found to exist in the cache memory 41, the MPU 434, in compliance with a subsequent input/output command, controls the cache port 432 to read the requested data from the cache memory 41, and supplies the data through the channel interface 431 to the channel unit 3. The channel unit 3 moves the data to the main storage 2. If the requested data is not stored in the cache memory 41, the MPU 434 writes positioning ordering information to the lower-rank interface controllers in the shared memory 47 through the shared memory port 433, gives an interrupt report through the channel interface 431 to the channel unit 3, and puts the upper-rank interface controller 43 in a wait state for an input/output command.

When the above wait state comes into effect or is finished, the lower-rank interface controller 43 periodically checks the contents of the shared memory 47 through the shared memory port 454 to find out if positioning ordering information has been given by any of the upper-rank interface controllers.

In the case of this embodiment, when a positioning indication from the upper-rank interface controller 43 is detected, the indication is read from the shared memory 47, and the positioning indication as well as the cylinder number and the head number included in the indication is supplied through the interface 451 to the disk unit 5, and the connection with the disk unit 5 is then cut off.

On completion of the head positioning, the disk unit 5 sends a signal representing the completion of the head positioning to the control interface 451. This signal is also sent to the control interface of the lower-rank interface controller 46. In the lower-rank interface controller 45, the MPU 455 periodically checks the contents of the control interface 451, and if the MPU 455 finds that the head positioning has been completed, it writes information regarding the completion of the head positioning in the register 458, and also writes, through the connector 49, information regarding the completion of the head positioning in a similar register of the upper-rank interface controller 44. The same operation is carried out also in the lower-rank interface controller 46. Since, in this case, information needs to be transmitted at high speed, information is transferred between the registers without the intermediary of the shared memory 47, and information regarding the completion of the head positioning is provided to all upper-rank interface controllers.

In the upper-rank interface controller 43, in response to the completion of the head positioning, the MPU 434 requests the channel unit 3 to perform a retry of the command, and when controlling the lower-rank interface controller 45, the MPU 434 controls the connector 49 to connect the register 436 only with the register 458 of the lower-rank interface controller 45 and also controls the data path changeover switch 47 to accept data from the lower-rank interface controller 45. Then on receipt of the command from the channel unit 3, the MPU 434 sends a data read request to the MPU 455 in the lower-rank interface controller 45 through the register 436, the connector 49 and the register 458. The MPU 455 starts the hardware timer 457 for detection of a command overrun and controls the control interface 451, the DBF 452 and the cache port 453 to read the data from the disk unit 5 and writes the data in the DBF 452 and the cache memory 41. Then, the MPU 455 reads, from among the accumulated data in the DBF 452, the data specified by the MPU 434 of the upper-rank interface controller 43, supplies the data to the upper-rank interface controller 43 which in turn transmits the data through the channel interface 431 to the channel unit 3. The lower-rank interface controller 45 notifies through the register 458, the connector 49 and the register 436 to the upper-rank interface controller 43 that the data transfer has been completed normally. The lower-rank interface controller 45 re-starts the hardware timer 457 and receives the next data transfer request. When data transfer is repeated in the same manner as mentioned above and completed normally, the MPU 455 of the lower-rank interface controller 45 notifies that the data transfer has ended through the register 458, the connector 49 and the register 436 to the MPU 434 of the upper-rank interface controller 43. The MPU 434 in turn notifies the completion of the command execution through the channel interface 431 to the channel unit 3, resets the connector 49 and the data path changeover switch 47 and waits for the next command from the channel unit 3.

If no data transfer request was given from any of the two upper-rank interface controllers by the time an operation to read data from the disk unit 5 should have started in response to the notice of the completion of the head positioning from the lower-rank interface controller 45, the lower-rank interface controller 45 detects this fact by the lapse of the set timing period of a timer installed in the memory 456, the MPU 455 resets the register 458 to cancel the positioning completion information and controls the control interface 451 and the cache port 453 to transfer, from the disk unit 5 to the cache memory 41, the data which has been specified by the cylinder number and the head number notified by the upper-rank interface controller 45. After the data is moved to the cache memory 41, information that data is waiting to be transferred is set in the shared memory 47 and the lower-rank interface controller 45 is put in a wait state. When the data is moved as mentioned above, the data memory location in the cache memory 41 is written in the directory 42. Either of the two upper-rank interface controllers, the upper-rank interface controller 43 for example, checks the contents of the shared memory 47 after the operation is finished, and if the occurrence of the above-mentioned wait for data transfer is detected, the MPU 434 makes a request through the channel interface 431 to the channel unit 3 for a retry of the command. When the command is given by the channel unit 3, the MPU 434 controls the cache port 432 and channel interface 431 to transfer the target data out of the data stored in the cache memory 41 to the channel unit 3.

If a data transfer request did not come from the upper-rank interface controller 43 by the time the operation to read data from the disk unit 5 should have started after the lower-rank interface controller 45 had sent the data to the upper-rank interface controller 43 in response to the first data transfer request, the lower-rank interface controller 43 detects this fact by the lapse of the set time of the timer 457. In consequence, the MPU 455 controls the control interface 451 and the cache port 453 to move the data read out from the disk unit 5 to the cache memory 41. On receipt of a data transfer request from the MPU 434 of the upper-rank interface controller 43, the MPU 455 notifies the occurrence of a command overrun through the register 458, the connector 49, and the register 436 to the MPU 434. In response to this notice, the MPU 434 notifies the interruption to the channel unit 3 through the channel interface 431, resets the data path changeover switch 47 and cuts off the connection between the upper-rank interface controller 43 and the lower-rank interface controller 45. When the data has been transferred from the disk unit 5 into the cache memory 41, the lower-rank interface controller 45 writes information regarding a wait for data transfer in the shared memory 47 and puts the lower-rank interface controller 45 in a wait state. Hereafter, in the same manner as in the lapse of the set time for a data transfer request described above, either of the upper-rank interface controllers, the upper-rank interface controller 43 for example, gets the requested data out of the data stored in the cache memory 41 and transfers it to the channel unit 3.

According to the present invention, the connecting path between the channel unit 3 and the disk unit 5 is divided into the upper-rank interface controller section and the lower-rank interface controller section, and therefore, when the head positioning has been completed in the disk unit 5, even if all of the upper-rank interface controllers are being engaged, for example, in data transfer between the channel unit 3 and the cache memory 41, either of the lower-rank interface controllers transfers data from the disk unit 5 into the cache memory 41 to thereby eliminate wasteful rotational delays of the disk unit 5.

Suppose that a command overrun occurred. Since the lower-rank and the upper-rank interface controller are provided separately, when the upper-rank interface controller is connected to the channel unit 3, the lower-rank interface controllers can be used to transfer data from the disk unit 5 into the cache memory 41, thereby getting rid of wasteful rotational delays of the disk unit 5.

Referring to FIG. 3, the outline of the operation of the disk cache control unit will now be described. In FIG. 3, the disk cache control unit is arranged such that the upper-rank interface controllers 43, 44 control the operation of the lower-rank interface controllers 45, 46, and when the disk unit 5 is accessed in response to an input/output command from the CPU 1, either one of the lower-rank interface controllers is made to operate to indicate the head positioning in the disk unit 5.

On the other hand, when data is transferred between the channel unit 3 and the disk unit 5, the upper-rank interface controllers 43, 44 cooperate with the lower-rank interface controllers 45, 46 in controlling the data transfer.

Figure 5:
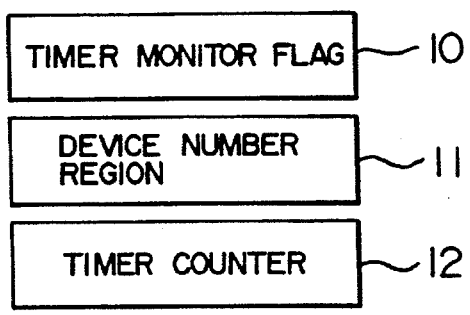
FIG. 5 is a conceptual diagram of items constituting a part of a lower-rank interface controller.

In this case, the memory of each of the lower-rank interface controllers 45, 46, which control the operation of the disk unit 5, includes, as shown in FIG. 5, a timer counter 12 for measuring the time spent in waiting for a data transfer request from the upper-rank interface controller 43 or 44 after the head is positioned to the target data in an optional disk unit 5, a timer monitor flag 10 by which the counter 12 is actuated to show whether or not there is a disk unit 5 waiting for a data transfer request described above, and a device number region 11 for storing device numbers by which to identify the disk unit 5 which is in a wait state for a data transfer request, said three items being arranged to be used adequately for various control operations to be described later.

Next, an example of the cache control operation in this embodiment will be described with reference to FIGS. 1 and 2.

Referring to FIG. 1, an operation will be described in which target data in a selected disk unit 5 is accessed directly from the channel unit 3, and there is contention between the completion of the head positioning to the target data in the disk unit 5 and other input/output processes in the upper-rank interface controllers 43, 44.

When an input/output command is issued from the CPU 1 to the channel unit 3, the channel unit 3 reads out a group of commands from the main storage 2 and starts the disk cache control unit 4. The start signal can be accepted by both the upper-rank interface controllers 43, 44, but since in the example of FIG. 1 the upper-rank interface controller 44 is already in the middle of command processing, the upper-rank interface controller 43 accepts the start signal.

On accepting the start signal, the upper-rank interface controller 43 decodes the command supplied by the channel unit 3 and checks the management information in the directory 42 to see if the requested data is present in the cache memory 41, and if the data is not stored in the cache memory 41, the upper-rank interface controller 43, in order to access the data in the disk unit 5, conveys through the shared memory 47 to the lower-rank interface controller 45 or 46 a request for the head positioning to the target data in the disk unit 5.

Then, the upper-rank interface controller 43 notifies the channel unit 3 that the processing of the command received therefrom is interrupted.

The above-mentioned request for the head positioning can be executed by both the lower-rank interface controllers 45, 46. However, in this case, let us suppose that the lower-rank interface controller 45 executes the request. In response to the head positioning request, the lower-rank interface controller 45 requests the disk unit 5 to position the head to the target data and breaks the connection with the disk unit 5.

When the disk unit 5 has completed the head positioning, both the lower-rank interface controllers 45, 46 detect this fact and notify the completion of the head positioning through the shared memory 47 to the upper-rank interface controllers 43, 44. Then, the lower-rank interface controllers 45, 46 activate the timer counter 12 and wait for a data transfer request to be issued by the upper-rank interface controller 43 or 44 to the lower-rank interface controller 45 or 46.

On receipt of a data transfer request, the lower-rank interface controller 45 or 46 controls the data transfer between the channel unit 3 and the disk unit 5 in cooperation with the upper-rank interface controller 43 or 44 that has issued the data transfer request.

In this case, the set time of the timer counter 12 is a time period from when a "Read/Write" command is given by the lower-rank interface controller 45 or 46 to the disk unit 5 after a data transfer request was issued from the upper-rank interface controller 43 or 44 until a read/write head, not shown, of the disk unit 5 reaches the limit position on a disk medium of the disk unit 5, up to which a desired data can be accessed without a rotational delay.

The condition of this example shown in those figures are such that both the upper-rank interface controller 43 and 44 are in the middle of command processing (data transfer is under way between the main storage 2 and the cache memory 41) and a time-out occurred in the timer counter 12.

Therefore, when a time-out occurs in the timer counter 12, a rotational delay of more than one rotation is required to access target data.

To avoid the occurrence of such a rotational delay, the following operation is performed.

The one of the lower-rank interface controllers 45, 46, which detected a time-out, checks the information on the operation state of the upper-rank interface controllers 43, 44 in a region, not shown, of the shared memory 47 to see if either of the upper-rank interface controllers 43, 44 detected a notice of the completion of the head positioning in the disk unit 5 and requested the channel unit 3 to do a retry of the command. If it is found from the above-mentioned operation state information that either of the upper-rank interface controllers 43, 44 requested a retry of the command, the lower-rank interface controllers 45, 46 wait for a data transfer request to be issued from either of the upper-rank interface controllers 43, 44. If it is found that a retry of the command has not been done, the lower-rank interface controllers 45, 46 try to make a connection with the disk unit 5 in which the head positioning has been completed. The lower-rank interface controller 46 that has succeeded in making the connection loads the data including the target data and data up to the end of the relevant track from the disk unit 5 into the cache memory 41.

Then, the lower-rank interface controller 46 notifies the presence of the target data in the cache memory to the upper-rank interface controllers 43, 44 through the shared memory 47. The lower-rank interface controller 45 that has failed in making a connection with the disk unit 5 stops its attempt to perform the loading operation mentioned above.

The upper-rank interface controller 44 which has finished the command processing, if it finds from the shared memory 47 that the data to access in the disk unit 5 exists in the cache memory 41, requests the channel unit 3 to do a retry of the command and accesses the cache memory 41 to get the desired data. The upper-rank interface controller 44 then processes a series of commands and reports the end of the process.

Referring to FIG. 2, description will be made of an operation to be performed when a command overrun has occurred in which a command requested by the side of the channel unit 3 does not arrive during a preparatory period in which the read/write head passes gaps provided between individual pieces of data while data is being transferred between the channel unit 3 and a selected disk unit 5 after a series of commands have been executed.

When an input/output command is issued by the CPU 1 to the channel unit 3, the channel unit 3 reads out commands from the main storage 2 and starts the disk cache control unit 4. The start signal can be accepted by both the upper-rank interface controllers 43, 44, but in this example, let us suppose that the start signal was accepted by the upper-rank interface controller 43.

On accepting the start signal, the upper-rank interface controller 43 decodes the command supplied by the channel unit 3 and checks the management information in the directory 42 to see if the requested data is present in the cache memory 41 and if the data is not stored in the cache memory, the upper-rank interface controller 43, in order to access the data in the disk unit 5, conveys through the shared memory 47 to the lower-rank interface controller 45 or 46 a request for head positioning to the target data in the disk unit 5.

Then, the upper-rank interface controller 43 notifies the channel unit 3 that the processing of the command received therefrom is interrupted.

The above-mentioned request for the head positioning can be executed by both the lower-rank interface controllers 45, 46. However, in this case, let us suppose that the lower-rank interface controller 45 executes the request.

In response to the head positioning request, the lower-rank interface controller 45 requests the disk unit 5 to position the head to the target data and breaks the connection with the disk unit 5.

When the disk unit 5 has completed the head positioning, both the lower-rank interface controllers 45, 46 detect this fact and notify the completion of the head positioning through the shared memory 47 to the upper-rank interface controllers 43, 44.

Then, the lower-rank interface controllers 45, 46 wait for a data transfer request to be issued from either of the upper-rank interface controllers 43, 44.

The upper-rank interface controller 44, which is in a free state and has detected the completion of the head positioning, requests the channel unit 3 to do a retry of the command and issues a data transfer request to the lower-rank interface controller 46. It ought to be noted that the operation of the data transfer request is carried out by the use of, for example, the registers 436, 458, shown in FIG. 4, for exchange of control information by the upper-rank interface controller 44 and the lower-rank interface controller 46.

The lower-rank interface controller 46, which has received a data transfer request, makes a connection with the disk unit 5 and transfers data in cooperation with the upper-rank interface controller 43. On the other hand, when a time-out occurs for a data transfer request, the lower-rank interface controller 45 which has been waiting for a data transfer request tries to make a connection with the disk unit 5 to load data from the disk unit 5 into the cache memory 41. However, since the lower-rank interface controller 46 has already been connected with the disk unit 5, the lower-rank interface controller 45 fails to connect with the disk unit 5 and stops its attempt to perform the data loading operation.

The lower-rank interface controller 46 transfers the data requested by a command given by a retry of the command and then notifies the normal end of the data transfer through the above-mentioned register for transmission of control information to the upper-rank interface controller 44. Then, the lower-rank interface controller 46 activates the hardware timer 457 as shown in FIG. 4 and waits for the next data transfer request to be supplied from the upper-rank interface controller 44.

On the other hand, on receiving from the lower-rank interface controller 46 a notice that the data transfer has ended normally, the upper-rank interface controller 44 gives a report on the end of the execution of the command and waits for the next command.

The time of the hardware timer which is set by the lower rank interface controller 46 is from just after the end of the data transfer until the moment when an access indication by the subsequent command arrives barely in time.

Therefore, after the time-out of the hardware timer, even if the lower-rank interface controller 46 receives a data transfer request from the upper-rank interface controller 43 or 44, decodes the request and issues an access indication to the disk unit 5, the target data cannot be accessed.

In the example of FIG. 2, a command was issued from the channel unit 3 too late, and while the lower-rank interface controller 46 was waiting for a data transfer request, a time-out occurred in the hardware timer, namely, a command overrun occurred. In this case, to access the target data, normally a rotational delay of more than one rotation is required for re-positioning.

In the case of this example, the occurrence of a rotational delay is avoided in the manner described below.

The lower-rank interface controller 46, which detected a time-out, transfers the target data and data up to the end of the relevant track from the disk unit 5 into the cache memory 41 and then notifies the presence of the target data in the cache memory 41 through the shared memory 47 to the upper-rank interface controller 44.

During this period, the upper-rank interface controller 44 issues a data transfer request to the lower-rank interface controller 46. The lower-rank interface controller 47 in turn notifies the upper-rank interface controller 44 of the occurrence of a command overrun which means that a command issued from the channel unit 3 was too late for the next data access operation.

On receipt of this notice, the upper-rank interface controller 44 notifies the channel unit 3 that the command processing under way is interrupted so that the lower-rank interface controller 46 waits for the target data to be stored in the cache memory 41.

On finding through the shared memory that the target data was stored in the cache memory 41, the upper-rank interface controller 44 requests the channel unit 3 to do a retry of the command and accesses the cache memory 41 to get the desired data. The upper-rank interface controller 44 processes a series of commands and reports the end of the processing.

Figure 7:
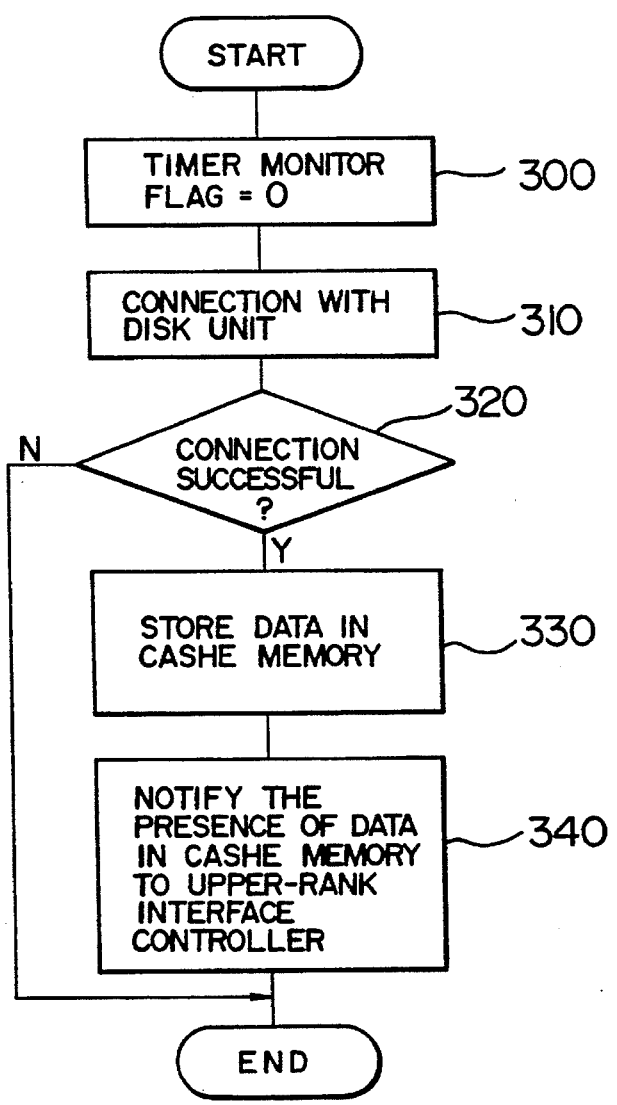
FIG. 7 is a flowchart for explaining in greater detail a part of the operation of the disk cache control unit according to an embodiment of the present invention.
Figure 6:
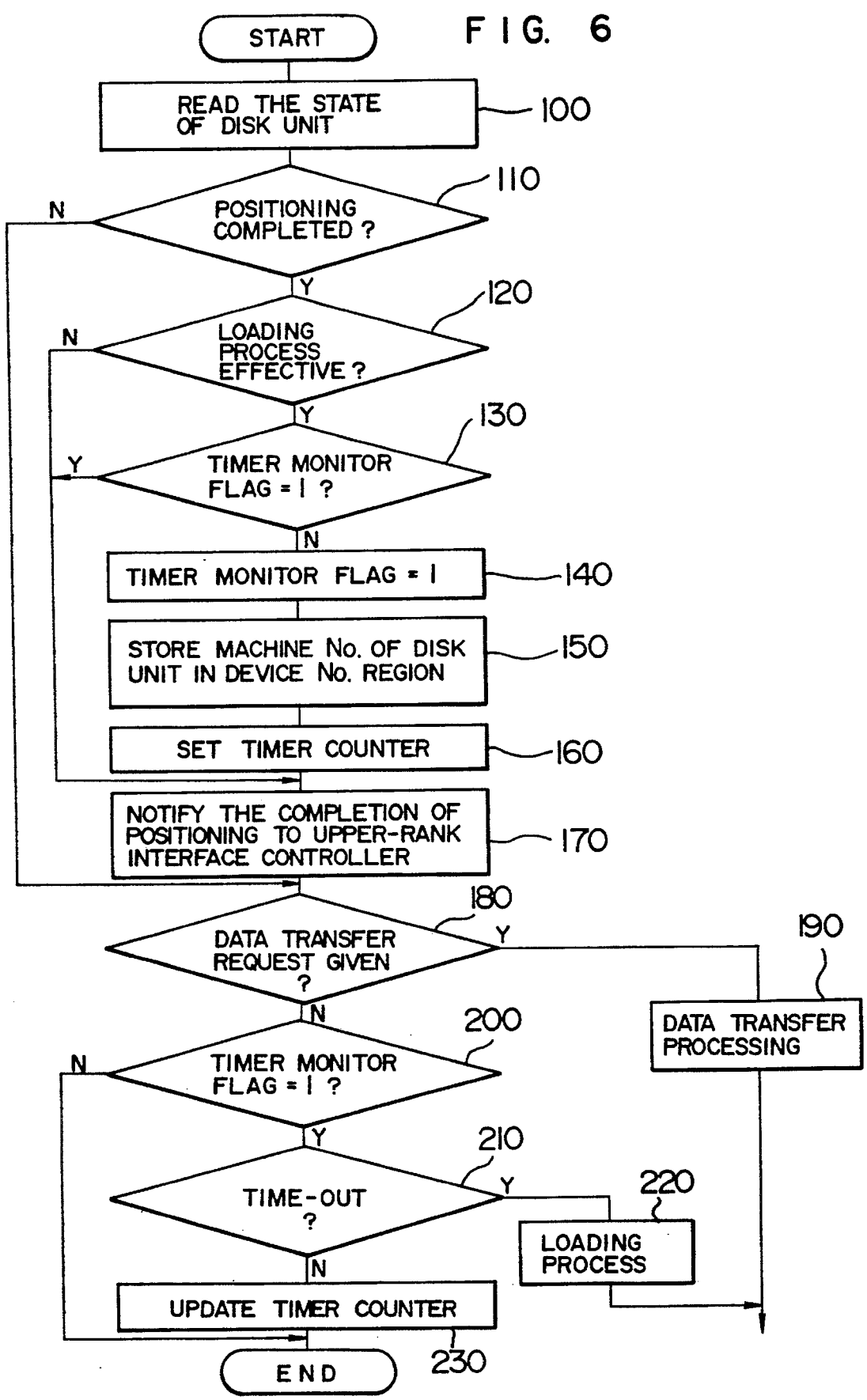
FIG. 6 is a flowchart for explaining an example of the operation of the disk cache control unit according to an embodiment.
Figure 8:
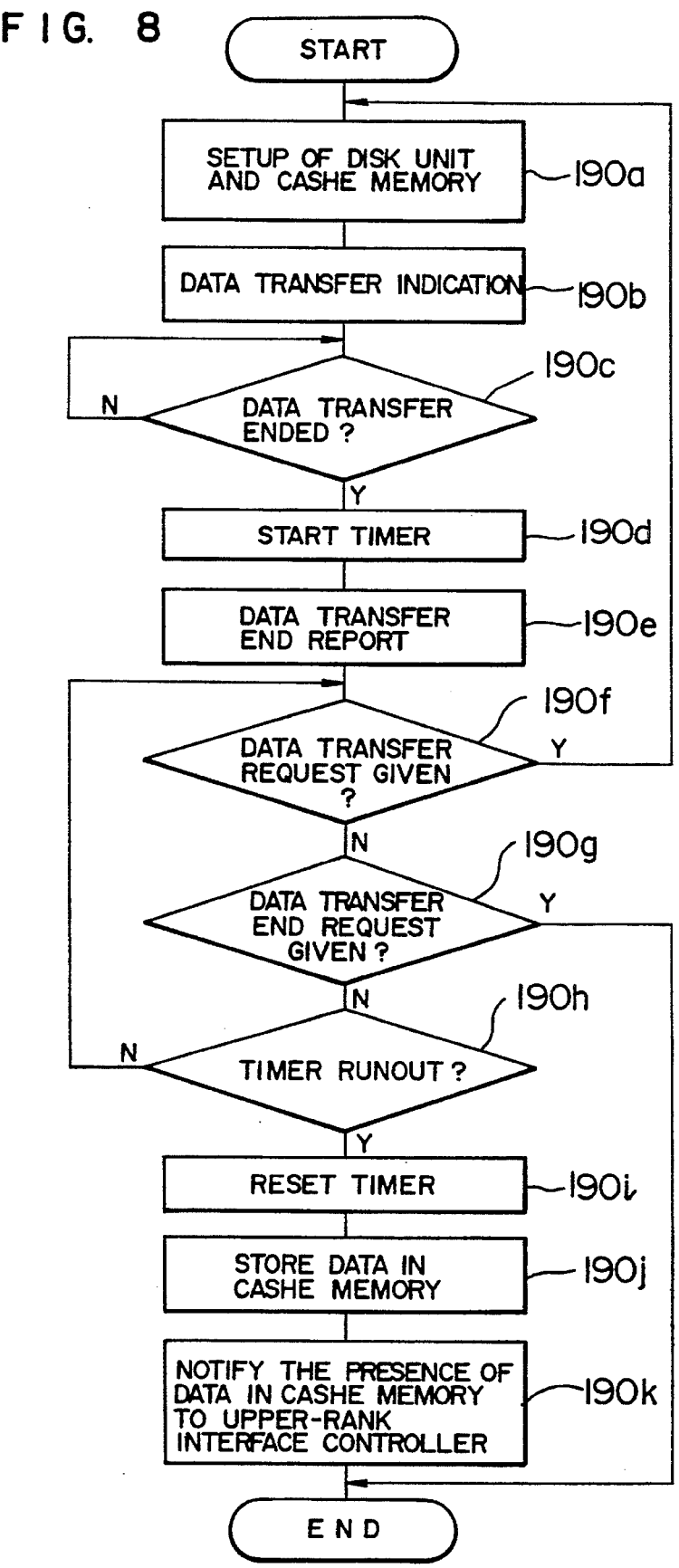
FIG. 8 is a flowchart for explaining in greater detail a part of the operation of the disk cache control unit according to an embodiment of the present invention.

With reference to FIGS. 6, 7 and 8, description will now be made of the details of the wait process for a data transfer request, the loading process and the data transfer process, which are carried out by each of the lower-rank interface controllers 45, 46.

Referring to FIG. 6, an example of the wait process for a data transfer request in each of the lower-rank interface controllers 45, 46 will be described below.

In FIG. 6, a lower-rank interface controller reads the state of the disk unit 5 (step 100), and judges whether or not the head positioning has been completed in the disk unit 5 (step 110).

If the head positioning has been completed, the lower-rank interface controller judges from the parameter of the command issued previously, if it can probably access the disk unit 5 even when the target data is stored in the cache memory 41 as if a command for a "write" operation is given next. (step 120)

The reason is as follows. With the commands which are accompanied by a data update process such as write-related commands, even if there is the target data in the volatile cache memory 41, the nonvolatile disk unit 5 is accessed to get the data to support the reliability of the volatile cache memory 41 in case trouble occurs in the power source. In such a case, therefore, loading data into the cache memory 41 becomes of no use.

When the disk unit 5 cannot be accessed, that is, when the data loading is judged effective, the timer monitor flag 10 is checked to see if there is already any other disk unit 5 waiting for a data transfer request (step 130), and if the timer monitor flag 10 is "0", that is, if there is no disk unit 5 waiting for a data transfer request, the timer monitor flag 10 is set to "1" (step 140), the device number of the disk unit 5 is stored in the device number area 11 (step 150), and a specified timer value is set in the timer counter 12 (step 160).

If the data loading is not judged effective in the step 120 mentioned above, steps 120 through 160 are skipped. When the timer monitor flag 10 is "1", that is, when there is a disk unit 5 waiting for a data transfer request, steps 140 through 140 are skipped.

Next, a notice that the head positioning has been completed in the disk unit 5 is transmitted through the shared memory 47 to the upper-rank interface controllers 43, 44 (step 170).

On the other hand, if in the above-mentioned step 110 a judgment is made that the disk unit 5 has not completed the head positioning, that is, if the disk unit 5 is in the middle of the head positioning, the steps 120 through 170 are skipped.

Then, a check is made if a data transfer request has been issued from either of the upper-rank interface controllers 43, 44 (step 180), and if there is a data transfer request issued, the lower-rank interface controllers 45 or 46 performs a data transfer process in cooperation with the upper-rank interface controller 43 or 44 that issued the data transfer request (step 190). Then, control returns to the starting point of a scan process to watch for the presence or absence of various commands issued from the upper-rank interface controller 43 or 44.

If there is no data transfer request issued, the timer monitor flag 10 is checked again (200), and if the timer monitor flag 10 is "1", a check is made if the timer counter 12 has reached a predetermined value, namely, if a time-out has occurred (step 210).

If a time-out has occurred, a data loading process is performed to transfer data from the disk unit 5 which has completed the head positioning into the cache memory 41 (step 220), and control returns to the starting point of a scan process.

If a time-out has not occurred, the timer counter 12 is updated. If the timer monitor flag 10 is "0" in step 200, steps 210 through 230 are skipped.

An example of the details of the loading process of step 230 will be described with reference to FIG. 6.

First, the timer monitor flag 10 is set to "0" and the wait state for a data transfer is reset (step 300).

Using the device number of the disk unit 5 stored in the device number area 11, an attempt is made to make a connection with the disk unit (step 320), and if a connection with the disk unit is successfully established, the target data and the other data up to the end of the relevant track of the disk unit whose head has been positioned is transferred to the cache memory 41 (step 330).

Meanwhile, in the loading process of data from the disk unit 5 into the cache memory 41, data may be loaded in units of either records or tracks.

After the data has been loaded, the presence of the data requested by an input/output command in the cache memory is notified through the shared memory 41 to the upper-rank interface controllers 43, 44 (step 340).

On the other hand, if it is found that the attempt to make a connection with the target disk unit failed, steps 330 and 340 are skipped.

An example of the detailed contents of the data transfer process of step 190 will be described with reference to FIG. 8.

In a scan process, on accepting a data transfer request from the upper-rank interface controller 43 or 44, the lower-rank interface controller judges whether the accepted data transfer request is to read data from or write data in the disk unit 5, and accordingly, specifies the number of bytes of data necessary for data transfer and whether to "read" or "write" data to the data transfer circuits, not shown, which are provided for the disk unit 5 and the cache memory 41 (step 190a). In addition, a data transfer start is indicated to the separate data transfer circuits (step 190b).

Thereafter, the lower-rank interface controller 45 or 46 waits until the data transfer ends (step 190c). When the data transfer has come to an end, a specified time is set in the hardware timers provided in the lower-rank interface controller 45 or 46 (step 190d).

The lower-rank interface controller gives a report about the result of the data transfer process (a normal end or an abnormal end) to the upper-rank interface controller 43 or 44 currently cooperating with the lower-rank interface controller 45 or 46. Then, the lower-rank interface controller 45 or 46 waits for a data transfer request from the upper-rank interface controller 43 or 44 (step 190f).

If a data transfer request does not come, the lower-rank interface controller makes a check to see if a request calling for the end of the data transfer has been issued (step 190g). If the above-mentioned request has not been issued, a check is made to see if a time-out has occurred in the hardware timer 457 (step 190h).

The above-mentioned steps 190f through 190h are repeated until any one of a data transfer request, a data transfer end request and a time-out of the hardware timer 457 occurs.

If a data transfer request is given, a data transfer process from step 190a on is performed. If a data transfer end request is given, the data transfer process is terminated and control returns to a scan process.

If a time-out occurred in the hardware timer 457, the hardware timer is reset (190i), the data to be accessed next by a data transfer request and subsequent data up to the end of the track are transferred into the cache memory 41 (step 190j).

Incidentally, the data may be transferred in units of either records or tracks from the disk unit 5 to the cache memory 41.

After the data has been transferred, a notice that the target data is present in the cache memory 41 is given through the shared memory 47 to the upper-rank interface controller 43 or 44 (step 190k), and control returns to the starting point of a scan process.

If, during this period, a data transfer request is issued from the upper-rank interface controller 43 or 44, a report on command overrun is given. If a data transfer end request is issued, nothing is done. In either case, a process of transferring data from the above-mentioned disk unit 5 to the cache memory 41 is continued. When a data transfer end request is received, the above-mentioned process may be terminated.

According to this embodiment, as shown in FIG. 1 for example, the upper-rank interface controllers 43 and 44 cannot access data in the disk unit, in which the head positioning has been completed, because the data requested by an input/output command is being transferred between the channel unit 3 and the cache memory 41. In this case, either of the lower-rank interface controllers 45, 46 reads out the target data from the disk unit 5 in which the head positioning has been completed and stores the data in the cache memory 41, and after either of the upper-rank interface controllers 43, 44 has completed the data transfer, it is possible to immediately access the target data in the cache memory 41, thus reducing chances of wasteful rotational delay in the disk unit 5.

In addition, a loading process of getting data from the disk unit 5 and putting it in the cache memory 41 is carried out only when the loading process is effective, thereby eliminating chances for a wasteful rotational delay to be performed.

As shown in FIG. 2, the upper-rank interface controller 43 or 44 cooperates with the lower-rank interface controller 45 or 46 in transferring data between the channel unit 3 and the disk unit 5. When a command overrun occurs in which a command from the channel 3 does not arrive in time for an access operation to the disk unit 5 by the lower-rank interface controller 45 or 46, the lower-rank interface controller 45 or 46 gets the data accessed by the command from the disk unit 5 and stores it into the cache memory 41. Since the upper-rank interface controller 43 or 44 can access the cache memory 41 to get the data requested by the above-mentioned command, it is not necessary to position the head in the disk unit 5 to access the target data, thus eliminating a rotational delay of the disk unit 5 resulting from the head positioning.

Since the upper-rank interface controller 43 or 44 can access the cache memory 41 to get the data requested by an input/output command, access to data is very quick.

The invention has been described concretely referring to a preferred embodiment of the invention. However, the present invention is not limited to the above preferred embodiment but, obviously, many modifications and variations of the invention are possible without departing from the spirit or scope of the invention.

The effects obtainable by representative embodiments of the invention disclosed in this patent application will be described briefly as follows.

According to the disk cache control method of the present invention, in a disk cache control unit disposed between the upper-rank processor and the disk unit and having a cache memory for holding a copy of the data stored in the disk unit, when the head is positioned to the data on the disk unit which is requested by an input/output command from the upper-rank processor, a judgment is made whether or not the data is accessible in a specified period of time, and if it is found that the data cannot be accessed in the specified period of time, the said data is stored in the cache memory, so that it is possible to respond to the said input/output command from the upper-rank processor with the data stored in the cache memory. For example, when data is transferred asynchronously between the CPU and the disk cache control unit, on the one hand, and between the disk cache control unit and the disk unit, on the other hand, even if there is contention between the completion of the head positioning to the target data in the disk unit and the transmission of other data between the upper-rank processor and the cache memory, the data to which the head has been positioned is not given up but the data is read out of the disk unit and stored in the cache memory, and after the transmission of other data between the upper-rank processor and the cache memory has been completed, the upper-rank processor is allowed to access the cache memory to obtained the target data, thereby reducing the occurrence of wasteful rotational delay necessary for the re-positioning of the head to access data on the disk unit.

According to the disk cache control method of the present invention, in the disk cache control unit disposed between the upper-rank processor and the disk unit and having a cache memory for holding a copy of the data stored in the disk unit, in access to the disk unit which is made in response to an input/output command from the upper-rank processor, if the above-mentioned input/output command did not arrive in time for an access operation to the disk unit, at least the data requested by the above-mentioned input/output command is stored in the cache memory, and the said data stored in the cache memory is used to respond to the input/output command. Therefore, in the data transmission between the CPU and the disk unit, for example, even if a command overrun occurs in which a part of a series of input/output commands issued from the CPU cannot arrive in time for an access operation on the disk unit side, the data stored in the cache memory can be used to respond to an input/output command given by a retry thereof resulting from the command overrun. As a result, it is possible to reduce wasteful rotational delays necessary for the re-positioning of the head in the disk unit for data access.

In the information processing system comprising an upper-rank processor, a disk unit and a disk cache control unit according to the present invention, wherein the disk cache control unit is installed between the upper-rank processor and the disk unit and has a cache memory for holding a copy of data stored in the disk unit, and wherein the disk cache control further comprises at least one first interface controller, operable mutually independently when there are more than one unit, for controlling the exchange of information with the upper-rank processor and at least one second interface controller for controlling the exchange of information with the disk unit, when accessing data stored in the disk unit in response to an input/output command from the upper-rank processor, before positioning the head to the target data in the disk unit, the second interface controller judges whether or not the data is accessible in a specified period of time, and if it is found that the data is not accessible in the specified period, the second interface controller stores at least the said data in the cache memory and notifies the presence of the data in the cache memory to the first interface controller. On receipt of the said notice from the second interface controller, the first interface controller responds to an input/output command with the said data stored in the cache memory. Therefore, for example, when data is transferred asynchronously between the CPU and the disk cache control unit, on the one hand, and between the disk cache control unit and the disk unit, on the other hand, even if there is contention between the completion of the head positioning to the target data on the disk unit side and the transmission of other data by the first interface controller between the upper-rank processor and the cache memory, the second interface controller does not give up the data to which the head has been positioned but obtains the data from the disk unit and stores the data in the cache memory, and notifies the presence of the target data in the cache memory to the first interface controller. On receipt of this notice, the first interface controller allows the upper-rank processor to access the cache memory to get the target data after the transmission of other data between the upper-rank processor and the cache memory has been completed. Consequently, wasteful rotational delays necessary for the re-positioning of the head to the data in the disk unit can be reduced.

Thus, it is possible to shorten the required time for the exchange of data between the upper-rank processor and the disk unit.

In the information processing system comprising an upper-rank processor, a disk unit and a disk cache control unit, wherein the disk cache control unit is installed between the upper-rank processor and the disk unit and has a cache memory for holding a copy of data stored in the disk unit, and wherein the disk cache control unit further comprises at least one first interface controller, operable mutually independently when there are more than one unit, for controlling the exchange of information with the upper-rank processor and at least one second interface controller for controlling the exchange of information with the disk unit, when accessing the disk unit in response to an input/output command from the upper-rank processor, if the said input/output command did not arrive in time for an access operation to the disk unit, the second interface controller stores at least the data requested by the said input/output command in the cache memory, and the first interface controller responds to the input/output command with the data stored in the cache memory. Therefore, for example, in the data transfer between the CPU and the disk unit, even if a command overrun has occurred in which a part of a series of input/output commands issued by the CPU did not arrive in time for an access operation on the disk unit side, the second interface controller stores the data in the cache memory and notifies the presence of the data in the cache memory to the first interface controller, and on receipt of this notice, the first interface controller responds to an input/output command involved in the command overrun and given by a retry thereof with the data in the cache memory, thereby reducing wasteful rotational delay necessary for the re-positioning of the head to access data on the disk unit.

Therefore, it is possible to shorten the required time for the transfer of data between the upper-rank processor and the disk unit.

What is claimed is:

1. A disk cache control unit installed between an upper-rank processor and a disk unit comprising:

a cache memory for holding a copy of a portion of data stored on the disk unit;

judging means, responsive to an input/output command from the upper-rank processor requesting that desired data be read out from the disk unit, for judging whether or not said desired data is stored in the cache memory;

means, responsive to a result of the judgment by the judging means, for reading out data from the cache memory when said desired data is stored in the cache memory and controlling the disk unit so that a range of data that is requested by the input/output command is read out from the disk unit when said desired data is not stored in the cache memory;

means for determining whether or not a transfer of said requested data from the disk unit to the upper-rank processor can be conducted in a specified time period beginning from a time after a head of the disk unit is positioned to said desired data on the disk unit in accessing data requested by an input/output command from the upper-rank processor, said specified time period being a time period necessary for reading out said desired data from the disk unit without waiting for a time period necessary for one rotation of a disk of the disk unit, said input/output command being a command for reading out from the disk unit said desired data which is required for data processing by the upper-rank processor; and means, responsive to a result of determination by the determining means, for transferring said desired data to the cache memory to be stored therein when the determining means determines that said desired data cannot be transferred, and thereafter, requesting the upper-rank processor to reissue said input/output command and reading out the data requested by the reissued input/output command from the cache memory to transfer said desired data to the upper-rank processor.

2. A disk cache control unit according to claim 1, further comprising:

an interface controller for controlling transfer of data between said disk unit and said upper-rank processor, and wherein said specified time period is a time period in which said interface controller can read data during a wait time within one rotation of the disk unit.

3. A disk cache control method performed by a disk cache controller for controlling transfer of data between an upper-rank processor, a disk unit and a cache memory which holds a copy of a portion of data stored on the disk unit, comprising the steps of:

in response to an input/output command from the upper-rank processor requesting that desired data be read out from the disk unit, judging whether or not said desired data is stored in the cache memory;

in response to a result of the judgement by the judging step, reading out data from the cache memory when said desired data is stored in the cache memory and controlling the disk unit so that a range of data that is requested by the input/output command is read out from the disk unit when said desired data is not stored in the cache memory;

when a head of the disk unit is positioned to said desired data on the disk unit in accessing said desired data in the disk unit as requested by an input/output command from the upper-rank processor, determining by the disk cache controller whether or not a data transfer request can be conducted in a specified time period following completion of head positioning to transfer the data requested by the input/output command from said disk unit to said upper-rank processor, said specified time period being a time period necessary for reading out said desired data from the disk unit without waiting for a time period necessary for one rotation of a disk of the disk unit, said input/output command being a command for reading out from the disk unit said desired data which is required for data processing by the upper-rank processor;

in response to a result of the determination by the determining step, transferring said desired data to the cache memory to be stored therein when the determining step determines that said desired data cannot be transferred, and thereafter, requesting the upper-rank processor to reissue said input/output command and reading out the data requested by the reissued input/output command from the cache memory to transfer said desired data to the upper-rank processor.

4. A disk cache control unit installed between an upper-rank processor and a disk unit comprising:

a cache memory for holding a copy of a portion of data stored on the disk unit;

judging means, responsive to an input/output command from the upper-rank processor requesting that desired data be read out from the disk unit, for judging whether or not said desired data is stored in the cache memory;

means, responsive to a result of the judgment by the judging means, for reading out said desired data from the cache memory when said desired data is stored in the cache memory and transferring the read-out desired data from the cache memory to the upper-rank processor, and reading out said desired data from the disk unit when said desired data is not stored in the cache memory and transferring the read-out desired data to the upper-rank processor;

means for determining whether or not a transfer of said desired data from the disk unit to the upper-rank processor can be completed during a time period necessary for reading out said desired data from the disk unit without waiting for a time period necessary for one rotation of a disk of the disk unit after a head of the disk unit is positioned to the desired data, said input/output command being a command for reading out from the disk unit said desired data which is required for data processing by the upper-rank processor; and means, responsive to a result of determination by the determining means, for transferring said desired data from the disk unit to the upper-rank processor if the means for determining determines that the transfer can be completed and storing said desired data in the cache memory and requesting the upper-rank processor to reissue said input/output command if the means for determining determines that the transfer cannot be completed.

5. A disk cache control method performed by a disk cache controller for controlling transfer of data between an upper-rank processor, a disk unit and a cache memory which holds a copy of a portion of data stored on the disk unit, comprising the steps of:

in response to an input/output command from the upper-rank processor requesting that desired data be read out from the disk unit, judging whether or not said desired data is stored in the cache memory;

in response to a result of the judgement by the judging step, reading out said desired data from the cache memory when said desired data is stored in the cache memory and transferring the read-out desired data from the cache memory to the upper-rank processor, and reading out said desired data from the disk unit when said desired data is not stored in the cache memory and transferring the read-out desired data to the upper-rank processor;

when a head of the disk unit is positioned to said desired data on the disk unit in accessing said desired data in the disk unit as requested by an input/output command from the upper-rank processor, determining by the disk cache controller whether or not a data transfer of said desired data can be completed during a time period necessary for reading out said desired data from the disk unit without waiting for a time period necessary for one rotation of a disk of the disk unit after the head is positioned to said desired data, said input/output command being a command for reading out from the disk unit said desired data which is required for data processing by the upper-rank processor;

in response to a result of the determination by the determining step, transferring said desired data from the disk unit to the upper-rank processor if the determining step determines that the transfer can be completed and storing said desired data in the cache memory and requesting the upper-rank processor to reissue said input/output command if the determining step determines that the transfer cannot be completed.

* * * * *

UNITED STATES PATENT AND TRADEMARK OFFICE
CERTIFICATE OF CORRECTION

PATENT NO. : 5,475,859
DATED : December 12, 1995
INVENTOR(S) : K. Kamabayashi, et al.

It is certified that error appears in the above-identified patent and that said Letters Patent is hereby corrected as shown below:

On the Title Page, Left-hand column, delete "[75] Inventors: Kosaku Kamabahashi;" and insert -- [75] Inventors; Kosaku Kambayashi --.

Signed and Sealed this

Thirtieth Day of July, 1996

Attest:

BRUCE LEHMAN

Attesting Officer

Commissioner of Patents and Trademarks